INVENTOR.
ALEXANDER D. ROUBLOFF
BY
Bean, Brooks, Buckley & Bean.
ATTORNEYS

INVENTOR.
ALEXANDER D. ROUBLOFF
BY
Bean, Brooks, Buckley & Bean
ATTORNEYS

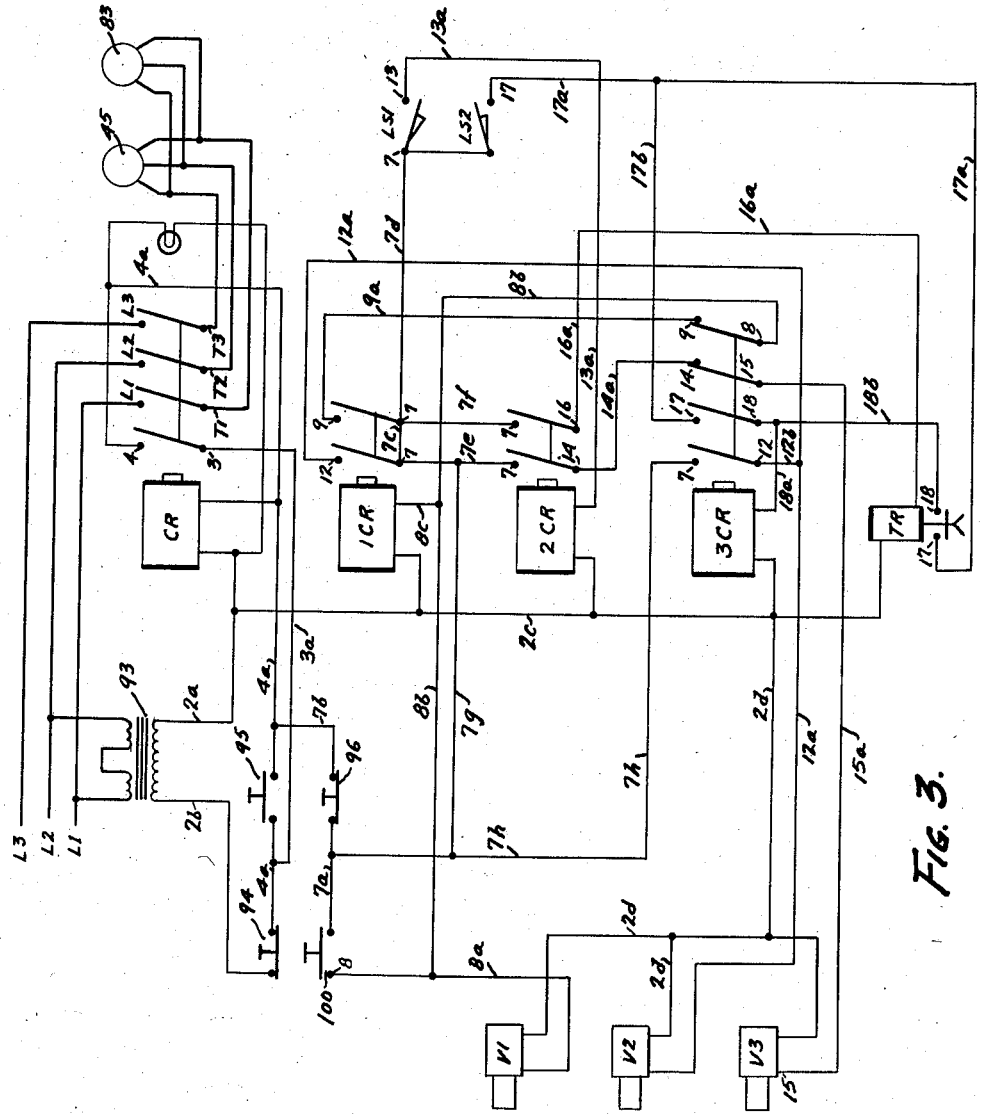

2,884,819

COUNTERSINK MACHINES

Alexander D. Roubloff, Kenmore, N.Y., assignor to Wiesner-Rapp Company, Inc., Buffalo, N.Y.

Application April 19, 1955, Serial No. 502,440

7 Claims. (Cl. 77—33.5)

My invention relates in general to countersinking machines and in particular to machines of the type which are semi-automatic in operation.

The principal object of the invention is to provide a countersinking machine using hydraulic means for foot and tool actuation.

Another object is to provide a machine which is easily adjustable to foot and countersink pressures adaptable to workpieces of various ductility.

A further object is to provide a device in which the hydraulic actuating means are controlled by electrical devices.

Another object is to provide means for relieving the pressure at the end of the countersinking operation and for rotating the tool for predetermined periods under light pressure so as to provide a clean smooth countersink.

A further object is to provide a machine in which the prescribed depth of a countersink may be accurately controlled.

The above objects and advantages have been accomplished by the device shown in the accompanying drawings, of which:

Fig. 3 is an electrical diagram showing the various relays and circuits for controlling the hydraulic means.

Figure 1:
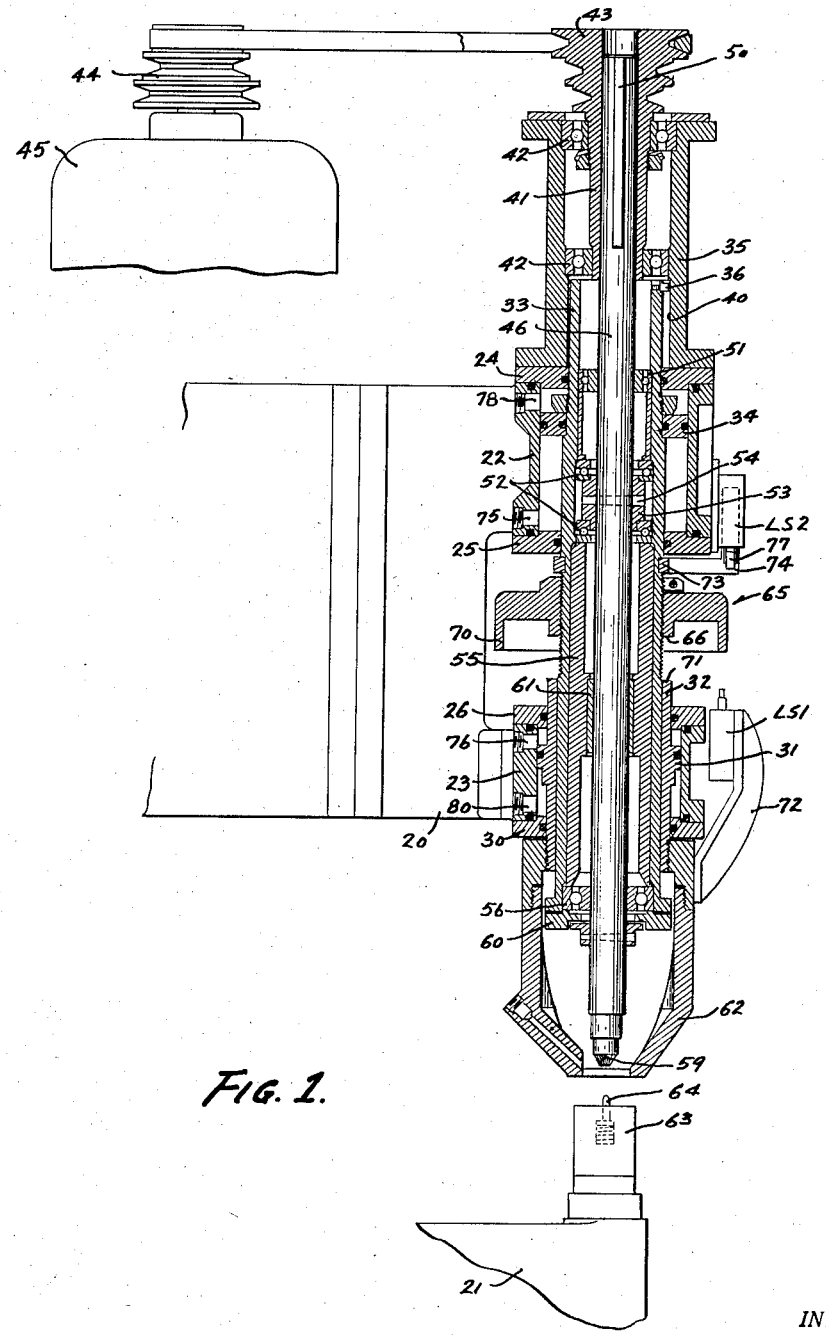
Fig. 1 is a side sectional elevation of my invention with portions thereof broken away.

My device comprises a suitable support, not shown for clearness of illustration, but having an upper jaw 20 and a lower jaw 21. A spindle cylinder 22 is carried by the upper portion of the upper jaw 20 and a foot cylinder 23 is carried by the lower portion of the upper jaw. The spindle cylinder has an upper spindle cylinder head 24 and a lower spindle cylinder head 25. In like manner, the foot cylinder 23 has an upper foot cylinder head 26 and a lower foot cylinder head 30. Slidably mounted within the foot cylinder is a foot piston 31 which is carried by a foot sleeve 32. The sleeve 32 extends through the foot cylinder heads 26 and 30 and is slidably mounted therein, suitable packing being provided to prevent leakage of oil. Mounted within the foot sleeve 32 is a spindle sleeve 33 which extends upwardly into the spindle cylinder 22 and through the heads 24 and 25 thereof, suitable packing being provided in the heads for preventing leakage of oil therethrough. Carried by the spindle sleeve is a spindle piston 34 which reciprocates within the spindle cylinder.

Mounted above the spindle cylinder and carried by the head 24 thereof is a spindle housing 35. The spindle sleeve 33 extends part way into this housing and a key 36 is carried by the spindle and is slidably mounted within a groove 40 formed in the spindle housing, whereby the spindle sleeve is allowed to freely reciprocate within the housing but is prevented from rotating therewith.

Mounted above the spindle sleeve and carried by the housing 35 is a spindle drive sleeve 41 which is supported by the housing in suitable anti-friction bearings 42 and which is formed at its upper exposed end with a step sheave 43. This sheave is connected to a complementary sheave 44 carried by the spindle motor 45 which is supported in any suitable manner upon the frame of the machine.

Extending centrally through the device is the countersink spindle 46 thereof. The upper end of this spindle is disposed within the spindle drive sleeve 41 and is provided with a key 50 which engages a suitable key-way (not shown), whereby the drive sleeve will cause the spindle to be rotated but will permit relative axial movement thereof with the sleeve. The spindle is supported near its upper end with an anti-friction bearing 51 which is mounted within the spindle sleeve. At a point substantially midway the length of the spindle, two anti-friction thrust bearings are provided, one arranged on each side of a thrust bearing collar 53. The thrust bearing collar is secured to the spindle against rotation preferably by the insertion of a pin 54 passing through the collar and spindle. Mounted within the lower end of the spindle sleeve is a spindle bearing sleeve 55 which supports the lower thrust bearing 52 at its upper end, and which bears against the lower anti-friction bearing 56 at its lower end. This bearing is supported by a retaining flange 60 suitably secured to the lower end of the spindle sleeve. The spindle bearing sleeve 55 carries a bearing 61 substantially at its central portion for the support of the spindle 46.

The countersink spindle extends downwardly below the end of the spindle sleeve and is provided at its lower end with a countersinking tool 59. The lower end of the spindle is surrounded by a foot 62 which is suitably attached to the lower end of the foot sleeve 32 and which is reciprocated by the foot piston 31. The lower jaw 21 of the machine is provided with a workpiece support 63 which carries a yieldably mounted pilot pin 64 for registration with the aperture of the workpiece which is to be countersunk.

Figure 2:
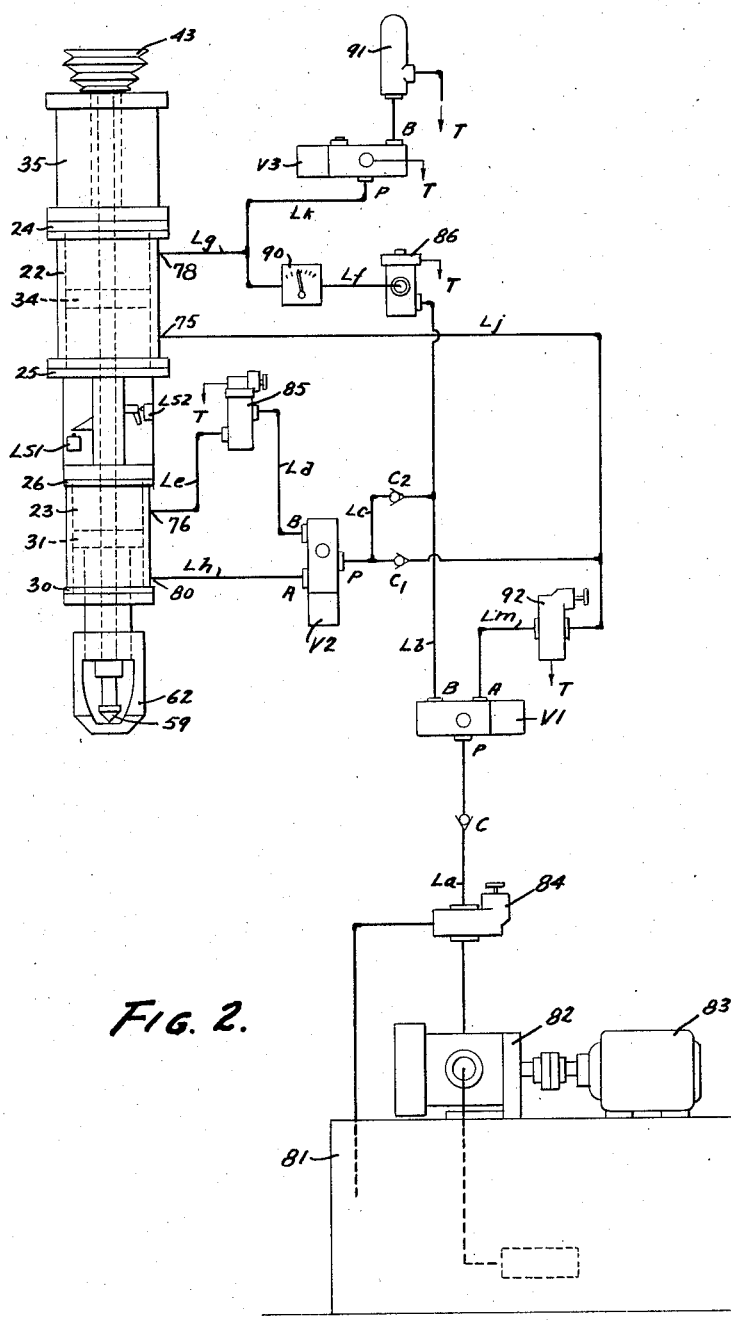
Fig. 2 is a diagrammatical view of the hydraulic system for actuating the machine.

Carried by the spindle sleeve at a point substantially midway its length and between the spindle cylinder and foot cylinder is a stop flange 65 having an inner annular shoulder 66 and an outer annular rim 70. This stop flange is screwthreaded to the sleeve whereby it may be axially adjusted upon the sleeve. Since it is essential that the depth of the countersink be governed from the top surface of the workpiece it is necessary that the distance between the countersinking tool and the bottom of the foot 62 be accurately determined. This is accomplished by adjustment of the stop flange so that when the spindle sleeve is moved downwardly during the countersinking action, the shoulder 66 will contact the upper surface 71 of the upper end of the foot sleeve 32 thereby limiting further downward movement of the countersinking tool. A limit switch LS1 which is carried by a bracket 72 is so adjusted that it will be actuated by contact with the rim 70 of the stop flange at precisely the same time that the shoulder 66 contacts the end 71 of the foot sleeve. The function and operation of this limit switch will be hereinafter described. Also carried by the spindle sleeve is a ring 73 having an upwardly extending arm 74 which has an inclined surface (not shown), and which engages the roller 77 of a limit switch LS2, to be hereinfter described. The spindle cylinder 22 is formed with an upper port 78 and a lower port 75 with which conduits L$g$ and L$j$, respectively, are connected as shown in Fig. 2. In similar manner the foot cylinder 23 is provided with an upper port 76 and a lower port 80 for connection, respectively, with the conduits L$e$ and L$h$ of the hydraulic diagram shown in Fig. 2.

Referring now to Fig. 2, where I show the various conduits and valves for controlling the actuation of my device, 81 represents a tank or reservoir for oil used on controlling the foot and countersink pistons. An oil pump 82 is provided for supplying oil under pressure to the hydraulic system and is driven by electric motor 83. In carrying out my invention I use a number of solenoid actuated fluid control valves, pressure regulating valves, a sequence valve and a flow control valve all of which are standard articles of manufacture and which are, therefore, not shown or described in detail. Connected in the main oil conduit La extending from the pump 82 is a main pressure relief valve 84 which controls the maximum pressure used within the system. This main conduit has a check valve C disposed therein and it is connected to the inlet port P of a solenoid actuated valve V1. This valve as well as the solenoid valve V2, to be hereinafter described, is provided with two outlet ports A and B, the solenoid valve V3 being provided with only one outlet port B and tank connection port T. When the solenoid valve V1 has been actuated, as will be hereinafter described, oil is directed to outlet B and passes through conduit Lb and through check valve C2, whence it is conducted through conduit Lc to the inlet P of solenoid valve V2. Solenoid valve V2 has been set by the electric circuit, hereinafter described, so that oil will pass through its outlet B and through conduit Ld to the pressure reducing valve 85 and thence through conduit Le to the port 76 of the foot cylinder. The pressure reducing valve 85 is so regulated that the pressure of the foot when bearing against the workpiece will be regulated to suit the hardness of the material being countersunk. Under the predetermined pressure exerted upon the foot piston 31, the foot will be forced downwardly into contact with the workpiece (not shown) which has previously been placed upon the work support 63 with the hole to be countersunk in registration with the pilot pin 64. When the predetermined pressure of the foot has been brought to bear against the workpiece, the pressure in the conduit Lb will be built up, and since this conduit is connected with the sequence valve 86 oil will be forced through this valve and through the flow control valve 90 through conduit Lf. From the flow control valve 90 the oil will be forced through conduit Lg to the inlet port 78 of the spindle cylinder, causing the piston 34 thereof to be moved downwardly to its working position. This flow control valve regulates the amount of oil supplied to the spindle cylinder 22 and, therefore, the speed at which the tool is fed to the work. Flow control valve 90 is also connected to inlet port P of a solenoid valve V3, and the outlet port B of the latter is connected to a pressure regulating valve 91 to be hereinafter described. The spindle motor having been energized, as will be described hereinafter, the spindle with its countersink will be rotated as it is forced toward the workpiece. It will be obvious that if the workpiece is aluminum or other non-ferrous material, great pressure upon the foot would mar the surface of the material, and, therefore, the pressure reducing valve 85 may be adjusted to suit the material being worked upon. When ferrous material such as stainless steel is to be countersunk the pressure upon the foot may be greatly increased. At the end of the countersinking operation, the shoulder 66 of the stop flange comes into contact with the surface 71 of the foot sleeve at substantially the same instant that the rim of the stop flange actuates the limit switch LS1. However, when the surface 66 contacts surface 71 the solenoid valve V3 is energized and its port P is, therefore, connected to port B, whereby some of the oil is permitted to return to the tank through valve 91, thereby reducing the combined pressure exerted by the spindle piston and the foot piston and avoiding excessive pressure upon the foot and consequent marring of the workpiece. This reduced pressure also permits the countersunk hole to be finished at reduced tool pressure. The spindle is permitted to rotate a predetermined time as governed by an electric time delay relay to be hereinafter described, and upon the termination of this predetermined period, solenoids V1 and V3 are deenergized. This permits oil to flow through port A of V1 and blocks port P in V3. Oil from valve V1 will pass through pressure reducing valve 92 and through conduit Lj to the lower port 75 of the spindle cylinder, thus causing the piston 34 therein to be moved upwardly. During this initial rise of spindle 46 the countersinking tool leaves the hole, while the foot continues to hold down the workpiece proper because oil is blocked by valve V2. When spindle 46 has lifted sufficiently so that countersinking bit has cleared the work, limit switch LS2 is actuated and deenergizes the solenoid of valve V2, connecting port P to port A and port B to the tank. Thus oil flows into the lower part of the foot cylinder and the foot also begins the rise away from the workpiece.

Referring now to Fig. 3, where I show in diagrammatical manner the electric circuits employed in carrying out my invention, L1, L2 and L3 represent the power lines which are connected to T1, T2 and T3, respectively, through a relay CR. Terminals T1, T2 and T3 are connected to the spindle motor 45 and hydraulic motor 83. The usual transformer 93 is provided for reducing the voltage to that which is suitable for the actuation of the solenoid valves V1, V2 and V3 and the actuating relays. The relay CR is connected to the low voltage side of the transformer by means of leads 2a and 2b, lead 2b being connected to one side of this relay by means of a normally closed stop switch 94 and a startrer switch 95. This relay is provided with normally open contacts L1–T1, L2–T2, L3–T3 for conducting current from the power lines L1, L2, L3, respectively, to the spindle and hydraulic motors 45 and 83, respectively. The relay CR is provided with contacts 3 and 4 which are closed when the relay is actuated, thus forming a holding circuit for the relay through leads 4a and 3a and transformer leads 2a and 2b. Each of the actuating relays 1CR, 2CR, and 3CR, as well as the time delay relay TR, have one terminal of their actuating coils connected to the lead 2a by means of branch lead 2c. Also connected to one terminal of the coils of the solenoid relays V1, V2 and V3 are branch leads 2d which receives current from the branch lead 2c. Connected to lead 4a and to the other side 2b of the supply line is a normally closed emergency stop switch 96 and an automatic start switch 100. The switches 96 and 100 are connected in series with each other and to the lead 4a and contact 8 of the start switch 100 by leads 7b and 7a. Contact 3 of relay CR is connected to 4a to a point between the switches 94 and 95 by means of a lead 3a so that current will be supplied thereto through stop switch 94 when the start switch 95 is opened. Contact 8 of the start switch 100 is connected to one of the terminals of the coil of solenoid valve V1 by means of lead 8a.

Relay 1CR has the other terminal of its coil connected to lead 8a by means of leads 8c and 8b, and it is provided with two pairs of contacts 7—12 and 7—9. The contact 7 of each pair is connected together by means of lead 7c and to the contact 7 of the limit switch LS1 by means of lead 7d. The terminal 13 of the limit switch LS1 is connected to the other side of relay 2CR by means of lead 13a. Terminal 12 of relay 1CR is connected by means of lead 12a and 12b to terminal 12 of relay 3CR and also to the other terminal of the coil of solenoid valve V2 by lead 12a. Terminal 9 of relay 1CR is connected by means of lead 9a to the normally closed contact 9 of relay 3CR. The companion normally closed contact 8 of relay 3CR is connected to the other coil terminal of relay 1CR by means of leads 8b and 8c. When relay 1CR is energized terminals 9—7 will be brought in series with normally closed terminals 9—8 of relay 3CR, thereby allowing current to pass through the coil of 1CR to maintain it in its energized position.

Relay 2CR is provided with two pairs of contacts 7—14 and 7—16 contacts 7 of each pair being connected with contacts 7 of relay 1CR by means of leads 7e and 7f. Lead 7e is connected to lead 7a by means of lead 7g and 7h. Contact 14 of relay 2CR is connected to normally closed contact 14 of relay 3CR by means of lead 14a, the cooperating contact 15 of 3CR being connected to the coil terminal 15 of solenoid valve V3 by means of lead 15a. Contact 7 of relay 3CR is connected to lead 7a by means of lead 7h. Contact 17 of relay 3CR is connected to lead 17a by means of lead 17b. Lead 17a connects the contact 17 of the limit switch LS2 to contact 17 of the time delay relay TR, the other contact 18 of this relay being connected to lead 18a and contact 18 of relay 3CR by means of lead 18b. The other terminal of limit switch LS2 is connected to terminal 7 of limit switch LS1.

When my machine is to be put into operation, the starter switch 95 is depressed closing the circuit through relay CR. Current will thus be fed to the spindle motor 45 and the hydraulic motor 83 through the closing contacts L1–T1, L2–T2, and L3–T3. Current will also flow through contacts 3—4 of relay CR thus maintaining this relay in closed position after the starter button is released. After the motors have been started, the manual switch 100 is closed thus energizing solenoid valve V1 and relay 1CR which latter is held in energized position through its contacts 7—9 and the normally closed contacts 8—9 of relay 3CR. With the energization of 1CR solenoid valve V2 is actuated. As hereinbefore described, oil will pass from port B of solenoid valve V1 to port P of solenoid valve V2 and thence through outlet port B of this valve to the upper side of the foot piston 31. Immediately upon contact of the foot with the workpiece oil under pressure is conducted to the upper side of the spindle piston 34 causing it to descend and feeding the countersink to the workpiece. When the switch LS1 is actuated at the predetermined depth of the countersink, relay 2CR will be actuated closing its normally open contacts. With the closing of contacts 7—14 of relay 2CR the solenoid valve V3 will be actuated through the normally closed contacts 14—15 of 3CR. The energization of this valve will cause the port P thereof to be connected to outlet port B and allow oil, in amounts regulated by the regulating valve 91, to return to the tank, thereby reducing the pressure in both cylinders. At this instant, the time relay TR is energized through closed contacts 7—16 of relay 2CR to permit the tool to remain in contact with workpiece at reduced pressure for a preset time to complete the cleaning operation of the countersink. Immediately upon the expiration of the preset time the timer relay deenergizes the solenoids of valves V1 and V3 and oil from the pump will flow through port A of the valve V1 and through pressure reducing valve 92 and through conduit Lj to the bottom of spindle piston 34. As soon as the tool is out of the countersink the limit switch LS2 is opened and V2 is deenergized and oil is supplied at reduced pressure governed by the regulating valve 92 with the lower part of the foot cylinder and spindle cylinder which are raised to their upper positions. At the end of the up stroke all valves are deenergized and the foot and spindle are held in their upper positions by low oil pressure. When another hole is to be countersunk the starter switch 100 will be again actuated and the circuits will be closed as just above described.

From the foregoing it will be obvious that by my device holes may be countersunk very accurately and to small tolerances from the top surface of the workpiece, and that the pressure of the spindle piston bearing upon the foot is released prior to the cleaning up operation brought about by reason of the time delay relay which permits the countersink tool to clean up the countersunk hole at reduced pressure. Advantages of the hydraulic circuit are that much greater cutting pressure required by the ferrous metals can be exerted by the use of adjustable hydraulic means and also permitting the same machine to be used on non-ferrous metals by varying both the foot pressure and/or the spindle pressure.

What is claimed is:

1. A countersinking machine comprising a tool carrying spindle, a spindle sleeve for rotatably supporting said spindle, said spindle being mounted in said spindle sleeve against relative axial movement therewith, means for rotating said spindle, a foot sleeve slidably mounted upon said spindle sleeve and carrying a foot disposed about the lower end of said spindle, and fluid pressure means for actuating said spindle and said foot downwardly into operative contact with the work and for returning said spindle and said foot to normal inoperative positions.

2. A countersinking machine comprising a tool carrying spindle, a spindle sleeve for rotatably supporting said spindle, said spindle being mounted in said spindle sleeve against relative axial movement therewith, means for rotating said spindle, a foot sleeve slidably mounted upon said spindle sleeve and carrying a foot disposed about the lower end of said spindle, and fluid pressure means for independently actuating said spindle sleeve and said foot sleeve downwardly into operative contact with the work and for returning said spindle and said foot to normal inoperative positions.

3. A countersinking machine comprising a tool carrying spindle, a spindle sleeve for rotatably supporting said spindle, said spindle being mounted in said spindle sleeve against relative axial movement therewith, means for rotating said spindle, a foot sleeve slidably mounted upon said spindle sleeve and carrying a foot disposed about the lower end of said spindle, coaxial fluid pressure means for independently actuating said spindle sleeve and said foot sleeve downwardly into operative contact with the work and for returning said spindle and said foot to normal inoperative positions, and means carried by said spindle sleeve and said foot sleeve for determining the depth of the countersinking tool from the top surface of the workpiece.

4. A countersinking machine comprising a tool carrying spindle, a spindle sleeve for rotatably supporting said spindle, said spindle being mounted in said spindle sleeve against relative axial movement therewith, means for rotating said spindle, a foot sleeve slidably mounted upon said spindle sleeve and carrying a foot disposed about the lower end of said spindle, fluid pressure means for independently actuating said spindle sleeve and said foot sleeve downwardly into operative contact with the work and for returning said spindle and said foot to normal inoperative positions, and adjustable means carried by said spindle sleeve and engageable with said foot sleeve for determining the depth of the countersinking tool from the top surface of the workpiece.

5. A countersinking machine comprising a tool carrying spindle, a spindle sleeve for rotatably supporting said spindle, said spindle being mounted in said spindle sleeve against relative axial movement therewith, means for rotating said spindle, a foot sleeve slidably mounted upon said spindle sleeve and carrying a foot disposed about the lower end of said spindle, a spindle cylinder surrounding said spindle sleeve, a foot cylinder surrounding said foot sleeve, a spindle piston carried by said spindle sleeve and disposed within said spindle cylinder, a foot piston carried by said foot sleeve and disposed within said foot cylinder, means for supplying oil to said cylinders to cause said spindle and said foot to be reciprocated.

6. A countersinking machine comprising a tool carrying spindle, a spindle sleeve for rotatably supporting said spindle, said spindle being mounted in said spindle sleeve against relative axial movement therewith, means for rotating said spindle, a foot sleeve slidably mounted upon said spindle sleeve and carrying a foot disposed about the lower end of said spindle, a spindle cylinder surrounding said spindle sleeve and formed with a fluid port at each end thereof, a foot cylinder surrounding said foot sleeve and provided with a fluid port at each end thereof, a spindle piston carried by said spindle sleeve and disposed within said spindle cylinder, a foot piston carried by said foot sleeve and disposed within said foot cylinder, a source of fluid under pressure, electrically controlled valve means for conducting fluid to the ports of said cylinders, and electric means associated with said valve means for controlling the timing and duration of fluid flow to said cylinders.

7. A machine for countersinking a workpiece, comprising a tool carried by a spindle, a spindle sleeve for rotatably supporting said spindle, said spindle being mounted in said spindle sleeve against relative axial movement therewith, means for rotating said spindle, a foot sleeve slidably mounted upon said spindle sleeve and carrying a foot disposed about the lower end of said spindle for contact with said workpiece, fluid pressure means for actuating said tool carrying spindle and said foot to effect countersinking, means for reducing the pressure exerted upon said spindle for a predetermined time just prior to the end of its working stroke, and time relay means to permit said tool to remain in contact with the workpiece at reduced pressure to complete the cleaning operation of the countersink.

References Cited in the file of this patent

UNITED STATES PATENTS

| | | |
|---|---|---|
| 1,244,112 | Mackle | Oct. 23, 1917 |
| 1,412,806 | Klausmeyer | Apr. 11, 1922 |
| 1,434,564 | Ruetschi | Nov. 7, 1922 |
| 2,271,717 | Schwartz | Aug. 3, 1940 |
| 2,684,017 | Schafer | July 20, 1954 |